United States Patent
Deb et al.

(10) Patent No.: US 11,487,682 B1
(45) Date of Patent: Nov. 1, 2022

(54) PRIORITY QUEUE SORTING SYSTEM AND METHOD WITH DETERMINISTIC AND BOUNDED LATENCY

(71) Applicant: NXP B.V., Eindhoven (NL)

(72) Inventors: Abhijit Kumar Deb, Eindhoven (NL); Donald Robert Pannell, Cupertino, CA (US); Claude Robert Gauthier, Los Gatos, CA (US)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/384,205

(22) Filed: Jul. 23, 2021

(51) Int. Cl.
*G06F 13/20* (2006.01)
(52) U.S. Cl.
CPC .................................... *G06F 13/20* (2013.01)
(58) Field of Classification Search
None
See application file for complete search history.

(56) References Cited

U.S. PATENT DOCUMENTS

| | | | | |
|---|---|---|---|---|
| 5,333,276 A * | 7/1994 | Solari | ................... | G06F 13/385 712/220 |
| 6,003,101 A * | 12/1999 | Williams | ................ | G06F 13/18 709/213 |
| 6,246,691 B1 * | 6/2001 | Briem | ..................... | H04L 49/90 370/444 |
| 6,842,821 B2 * | 1/2005 | Nystuen | .............. | G06F 13/1626 711/158 |
| 7,248,593 B2 * | 7/2007 | Minnick | ............. | H04L 47/2441 370/395.42 |
| 2006/0050683 A1 * | 3/2006 | Wall | ........................ | H04L 67/61 370/352 |

OTHER PUBLICATIONS

Chao, H. Jonathan "A Novel Architecture for Queue Management in the ATM Network." *IEEE Journal on Selected Areas in Communications*, vol. 9, No. 7, Sep. 1991. pp. 1101-1118.

Moon, Sung-Whan et al. "Scalable Hardware Priority Queue Architectures for High-Speed Packet Switches." *IEEE Transactions on Computers*. vol. 49, No. 11, Nov. 2000 pp. 1215-1227.

Rexford, Jennifer et al. "A Router Architecture for Real-Time Communication in Multicomputer Networks." *IEEE Transaction on Computers*, Vo.47, No. 10. Oct. 1998. pp. 1088-1101.

* cited by examiner

*Primary Examiner* — Elias Mamo

(57) ABSTRACT

A priority queue sorting system including a priority queue and a message storage. The priority queue includes multiple priority blocks that are cascaded in order from a lowest priority block to a highest priority block. Each priority block includes a register block storing an address and an identifier, compare circuitry that compares a new identifier with the stored identifier for determining relative priority, and select circuitry that determines whether to keep or shift and replace the stored address and identifier within the priority queue based on the relative priority. The message storage stores message payloads, each pointed to by a corresponding stored address of a corresponding priority block. Each priority block contains its own compare and select circuitry and determines a keep, shift, or store operation. Thus, sorting is independent of the length of the priority queue thereby achieving deterministic sorting latency that is independent of the queue length.

20 Claims, 6 Drawing Sheets

PRIORITY QUEUE SORTING SYSTEM AND METHOD WITH DETERMINISTIC AND BOUNDED LATENCY

BACKGROUND

Field of the Invention

The present invention relates in general to sorting schemes, and more particularly to a priority queue sorting system and method with deterministic and bounded latency.

Description of the Related Art

Many applications use networks with different communication protocols. Interface components are designed to establish links between the different communication protocols so that they may exchange information with each other. In some applications, such as automotive applications and the like, the interface components interposed between subnetworks operating with different protocols are required to offer low and deterministic latency. One or more of the subnetworks of the overall network may operate at a faster transmission rate so that message queues may be used to provide buffers between the different subnetworks. Certain networks operate with a priority scheme in which stored messages in a message queue should be transmitted in an order of priority in addition to chronological order. Thus, the message queue needs to be continuously sorted according to priority in order to ensure that the highest priority message is selected for transmission. In many conventional sorting schemes, sorting time, and thus latency, increases as the size of the queue grows. Latency, therefore, may not be sufficiently deterministic when using conventional sorting schemes.

BRIEF DESCRIPTION OF THE DRAWINGS

Embodiments of the present invention are illustrated by way of example and are not limited by the accompanying figures. Similar references in the figures may indicate similar elements. Elements in the figures are illustrated for simplicity and clarity and have not necessarily been drawn to scale.

DETAILED DESCRIPTION

A priority queue sorting system and method with deterministic and bounded latency as described herein can sort a message queue where the sorting time is independent of the length of the queue so that it may be used to build an interface link with low and deterministic latency. A priority queue includes a cascaded set of priority blocks (PBs) each having substantially the same control circuitry. As a result, PBs can be cascaded to form a linear chain or a ring, in which each message identifier and associated memory address pointing to an associated message payload are stored in a sorted way. Each PB contains its own compare and select circuitry that compares a locally stored identifier with a new identifier and based on the comparison result, determines whether to keep or shift and replace the locally stored address and the locally stored identifier. The address and identifier may be replaced by a new address and identifier or by an address and identifier shifted from a next higher priority PB. As a result, sorting does not depend on the length of the priority queue thereby achieving deterministic sorting latency that is independent of the queue length. In addition, scaling the number of messages supported becomes independent of the queue length.

An overwrite bit may be included. When the overwrite bit is true, an old message in the queue may be replaced with a new message having the same priority, which is an important operation for older low priority Controller Area Network (CAN) messages that are refreshed with new data periodically. When the overwrite bit is false, equal priority messages are stored within the queue in temporal order, which is a desired operation to support firmware downloads. As a result, both temporal-based and priority-based ordering are maintained.

Figure 1:
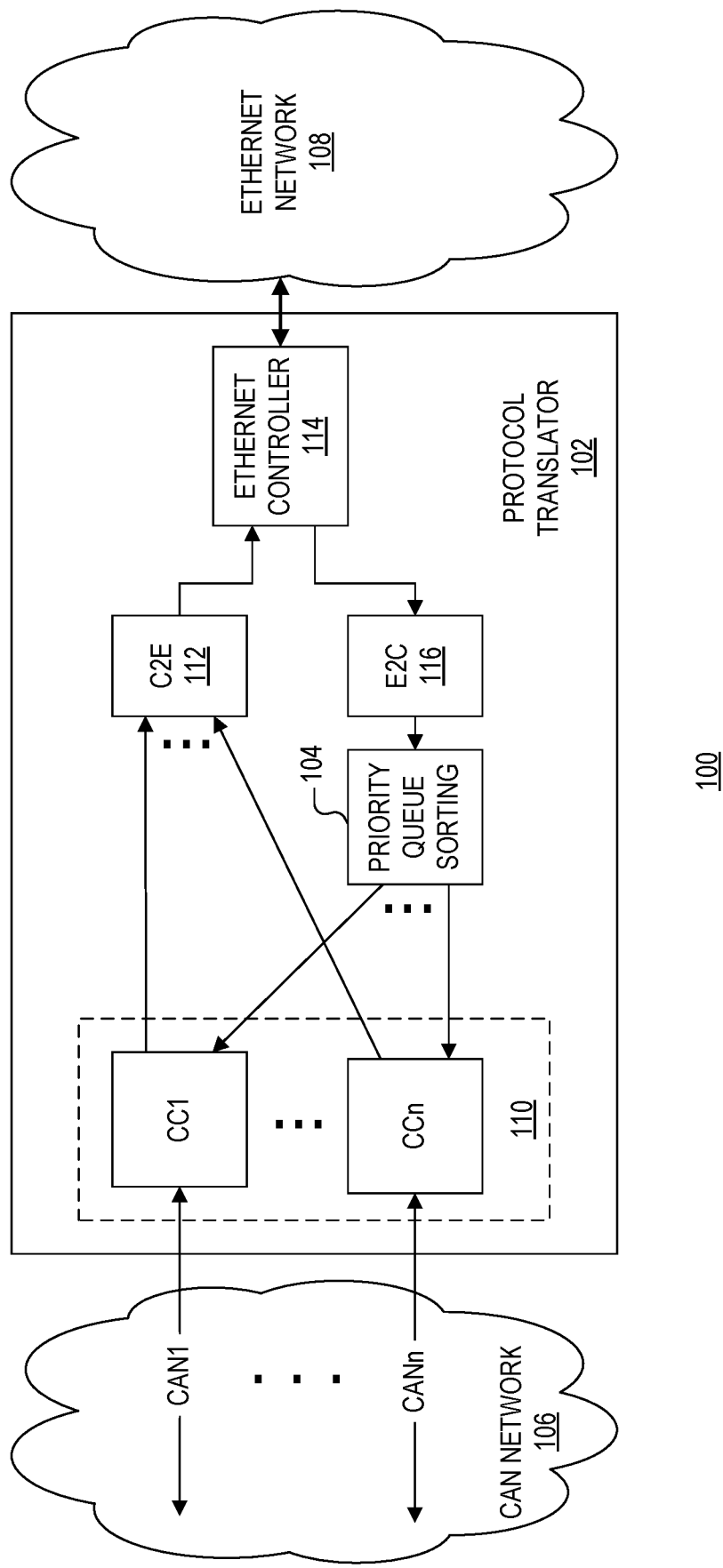
FIG. 1 is a simplified block diagram of a communication system including multiple networks and a protocol translator which includes a priority queue sorting system implemented according to an embodiment of the present disclosure.

FIG. 1 is a simplified block diagram of a communication system 100 including multiple networks and a protocol translator 102 which includes a priority queue sorting system 104 implemented according to an embodiment of the present disclosure. The communication system 100 includes a CAN network 106 and an Ethernet network 108 that are able to exchange information with each other through the protocol translator 102. The communication system 100 may be used within many different types of applications. In one embodiment, for example, the communication system 100 is part of an In-Vehicle Network (IVN) used within a vehicle such as an automobile or the like. IVNs are requiring higher bandwidths to support more advanced applications in modern automobiles. Ethernet is a network technology that provides higher bandwidth so that it has been introduced within the IVN of newer vehicles. Due to cost reasons, however, legacy IVN components are widely used within the IVN so that there is a need for these different network protocols and technologies to co-exist in the communication system 100.

The protocol translator 102 provides communication between legacy network technologies, such as CAN, and newer network technologies, such as Ethernet. The protocol translator 102 translates one frame format to another and provides a link between the different network types including the CAN network 106 and the higher speed Ethernet network 108. In the illustrated embodiment, the CAN network 106 includes an integer number "n" of CAN subnetworks or buses, shown as CAN1, CAN2, . . . , CANn. The protocol translator 102 packs one or more CAN messages into an Ethernet frame and transmits it over a highspeed Ethernet link to the Ethernet network 108. In one embodiment, the protocol translator 102 includes n CAN controllers (CCs) 110, individually shown as CC1, . . . , CCn, each receiving CAN messages from a corresponding one of the CAN buses CAN1-CANn and providing received messages to a CAN to Ethernet (C2E) converter 112. The C2E converter 112 encapsulates the CAN messages into an Ethernet frame and provides the frame to an Ethernet controller 114, which transmits the frame to the Ethernet network 108.

The protocol translator 102 also unpacks each Ethernet frame received from the Ethernet network 108 by the Ethernet controller 114, which provides the Ethernet frame to an Ethernet to CAN (E2C) converter 116. The E2C converter 116 extracts one or more embedded CAN message(s) and transmits the extracted CAN message(s) to corresponding ones of the CAN controllers 110 to the addressed CAN buses within the CAN network 106. Ethernet typically operates at 100 Megabits per second (Mbps) to 1 Gigabits per second (Gbps) or faster, whereas the CAN controllers 110 only operate at 1 to 10 Mbps. Thus, the E2C converter 116 often generates more CAN messages that can be transmitted by the CAN controllers 110 at any given time. The priority queue sorting system 104 temporarily stores the CAN messages received from the E2C converter 116 and prioritizes the CAN messages into corresponding queues for each of the CAN controllers 110. When a CAN controller 110 is available to transmit a message and the corresponding queue has stored messages, the priority queue sorting system 104 selects the highest priority CAN message for transmission by the corresponding CAN controller 110. The priority queue sorting system 104 thus performs prioritization and selection of CAN messages. As described further herein, the priority queue sorting system 104 ensures that the latency on the Ethernet to CAN path is deterministic.

The E2C converter 116 receives Ethernet frames in the chronological order of Ethernet frame reception in time. The CAN protocol dictates, however, that the stored messages in each queue be transmitted in the order of message priority. As a result, the priority queue sorting system 104 sorts each message queue in the order of priority. In conventional configurations, the longer the queue, the greater the latency so that latency at any given time was often non-deterministic. To support deterministic latency, the sorting operation needs to be independent of the length of the message queue, and to support a wide range of priority levels, the architecture needs to be scalable in terms priority levels and queue length. Also, a newer CAN message may contain the same priority as one of the messages previously stored into a queue. Sometimes it may be desired to transmit these equal-priority messages in the temporal order received. Other times it may be desired to overwrite a message in a queue based on a user defined condition to ensure that an older message is overwritten by an equal-priority newer message. The priority queue sorting system 104 performs priority-based sorting among messages of different priorities and temporal sorting among the messages of the same priority with conditional overwrite.

Figure 2:
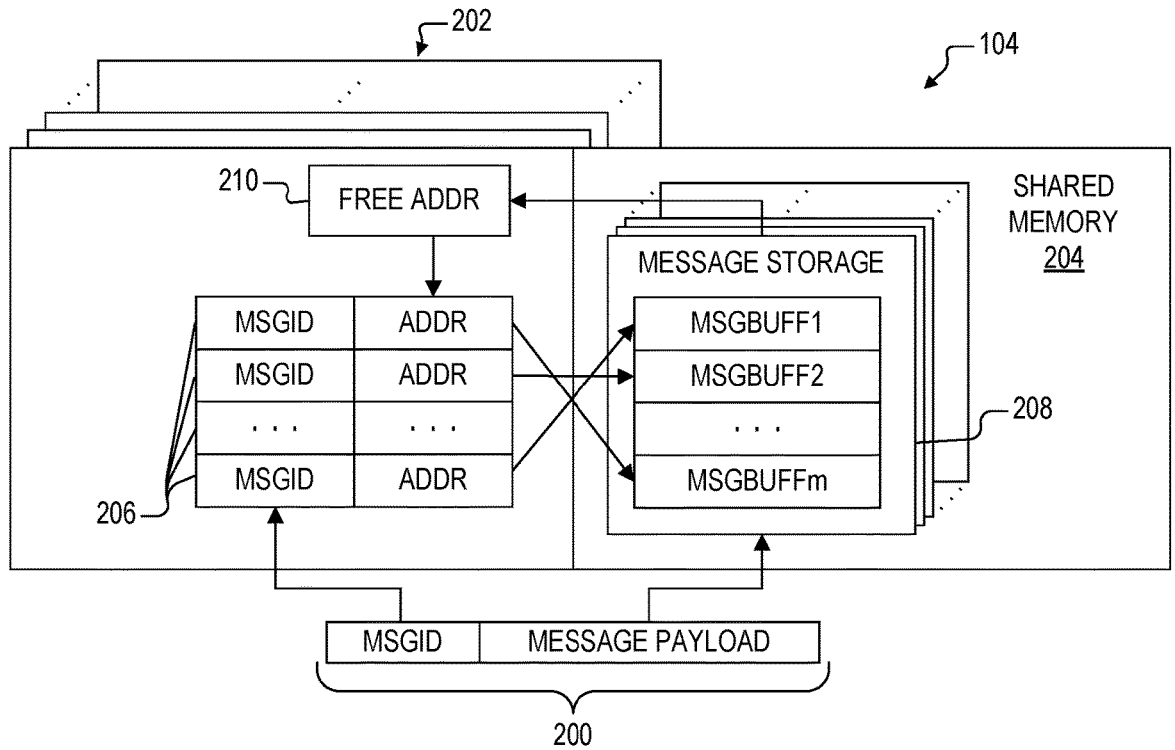
FIG. 2 is a simplified block diagram of the priority queue sorting system of claim 1 implemented according to one embodiment of the present disclosure.

FIG. 2 is a simplified block diagram of the priority queue sorting system 104 implemented according to one embodiment of the present disclosure. A CAN message 200 is received from the E2C converter 116 and includes a message identifier (MSGID) and a corresponding message payload. In the illustrated embodiment, the priority queue sorting system 104 includes a shared memory 204 and an integer number "n" priority queues 202, one for each of the CAN buses CAN1-CANn. Each priority queue 202 includes one or more register blocks 206 including one register block per queue entry. A message storage 208 may be allocated within the shared memory 204 for each of the priority queues 202, in which each message storage may be subdivided into message buffers, shown individually as MSGBUFF1, MSGBUFF2, . . . , MSGBUFFm for an integer number "m" of message buffers. In this manner, each message storage 208 includes corresponding message buffers for storing the message payloads of the CAN messages enqueued within a corresponding one of the priority queues 202. The shared memory structure with message storages and corresponding message buffers is exemplary only and illustrates only one of many different types of memory structures that may be used for storing the message payloads.

The register block 206 for each queue entry is used for storing a MSGID and a corresponding memory address (ADDR) pointing to a location within the message storage 208 of the shared memory 204 for storing a corresponding message payload. In one embodiment, the register block 206 may include a single register for storing both MSGID and ADDR. In another embodiment, the register block 206 includes a first register for storing the MSGID and a second register for storing the ADDR. When a new message payload of a new CAN message is stored at a next free message buffer pointed to by a corresponding free address within the corresponding message storage 208, that free address, shown as FREE ADDR 210, is provided as the address ADDR to be stored within a register block 206 of a corresponding one of the n priority queues 202.

In operation, the E2C converter 116 extracts CAN messages and either the E2C converter 116 or the priority queue sorting system 104 identifies a corresponding one of the CAN controllers 110 and a corresponding one of the CAN buses CAN1-CANn for which the CAN message is intended. The priority queue sorting system 104 receives the next CAN message (e.g., 200), selects the corresponding one of the priority queues 202, presents the MSGID to the corresponding priority queue 202, and stores the corresponding message payload into the corresponding message storage 208. In one embodiment, an overwrite (OVR) value (e.g., bit) (FIG. 3) identifies whether a previously received CAN message with a priority level matching the new CAN message is to be overwritten. Either a global OVR value may be used for all n priority queues 202 or a separate OVR value may be provided for each priority queue 202. When the OVR value is false or when the priority level of the new CAN message does not match any of the CAN messages stored in the corresponding priority queue 202, then the message payload is stored at the next free address within the corresponding message storage 208 and the address is provided as the FREE ADDR 210. The corresponding priority queue 202 inserts the MSGID and the corresponding ADDR into a corresponding register block 206. When, however, the OVR value is true and the priority level of the new CAN message matches a CAN message stored in the corresponding priority queue 202, then the ADDR value from the matching queue entry of the corresponding priority queue 202 is used as the address value to store the new message payload into the corresponding message buffer of the corresponding message storage 208, in which the previously stored message payload is overwritten by the new message payload.

Figure 3:
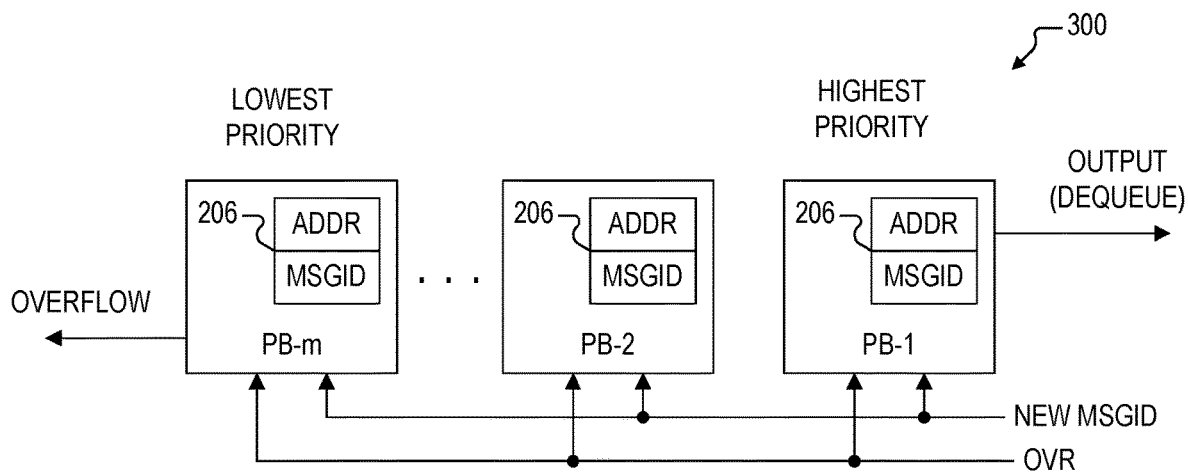
FIG. 3 is a simplified block diagram of a priority queue that may be used as any one or more up to all of the priority queues of FIG. 2 according to one embodiment of the present disclosure.

FIG. 3 is a simplified block diagram of a priority queue 300 that may be used as any one or more up to all of the n priority queues 202 according to one embodiment of the present disclosure. The priority queue 300 includes a cascaded chain of an integer number "m" priority blocks (PBs) from a highest priority block PB-1 to a lowest priority block PB-m. Each PB includes a register block 206 for storing the MSGID and corresponding ADDR pointing to the corresponding message payload stored in the corresponding message storage 208. As described further herein, each PB may be implemented as a compare-shift block which further includes compare circuitry and select circuitry that receives the new MSGID and the OVR value for determining how to insert the new CAN message into the priority queue 300. The integer value "m" may be fixed or variable depending upon the particular implementation. In one embodiment, for example, m is a fixed value M in which each priority queue 202 has a fixed size including M PBs for storing up to M queue entries. It is noted that the total number of possible priority levels may exceed the finite number M of queue entries, so that if the priority queue 300 becomes full, additional messages may cause an "overflow" so that the lowest priority messages are discarded. In an alternative embodiment, m incrementally increases for storing each new message from zero up to a predetermined maximum number of queue entries depending upon memory constraints, in which the predetermined maximum number may be selected to eliminate or minimize overflow.

In operation, each PB determines how to insert each new CAN message into the priority queue 300 based on the value of OVR and based on relative priority of the new MSGID with the currently stored MSGIDs. In the CAN architecture, the MSGID itself determines the relative priority in which a lower or smaller MSGID has a higher priority. Each valid PB compares its locally stored MSGID with the new MSGID for determining where and how to insert the new CAN message. In one embodiment, each existing PB in the priority queue 300 having a higher priority MSGID (e.g., lower MSGID value), remains unmodified, and each PB in the priority queue 300 having a lower priority MSGID (e.g., higher MSGID value) is shifted within the priority queue 300 towards the lower priority end. If the priority queue 300 is currently full such that it contains a maximum number of PBs, then the lowest priority PB is shifted out as OVERFLOW (shown on the left-most side) meaning that its information is discarded.

When the priority of the new MSGID matches a local MSGID of one of the existing PBs in the priority queue 300, then operation depends upon the OVR value. When the OVR value is true and the new MSGID matches an MSGID currently stored within the priority queue 300, then each of the PBs of the priority queue 300 remains unmodified. Instead, the new message payload replaces the current message payload in the message buffer in the corresponding message storage 208 pointed by the corresponding ADDR of the matching entry. When the OVR value is false and at least one matching MSGID is within the priority queue 300, then the new CAN message is stored within a new PB behind the matching PB towards the lower priority end as though it were a lower priority message. Essentially, when the OVR value is false, two or more matching identifiers may form a first-in-first-out (FIFO) subset of matching entries within the priority queue 300 as further described herein.

When the corresponding CAN controller 110 is available to receive and send a CAN message on the corresponding CAN subnetwork, the MSGID of the highest priority PB (shown on the right-most side) of the priority queue 300 is OUTPUT (e.g., DEQUEUED) along with the corresponding message payload from the message storage 208 pointed to by the ADDR value of the highest priority PB. As described further herein, in one embodiment the priority queue 300 is organized as a fixed-size linear chain in which the ADDR and MSGID stored in the record block 206 of each of the PBs may be shifted each time the highest priority content is dequeued. In another embodiment described further herein, the priority queue 300 may be organized as a fixed-size circular buffer including a head pointer that is updated after each dequeue operation to identify the highest priority PB. A circular buffer has an advantage of avoiding a shifting operation after the highest priority message is dequeued.

Figure 4:
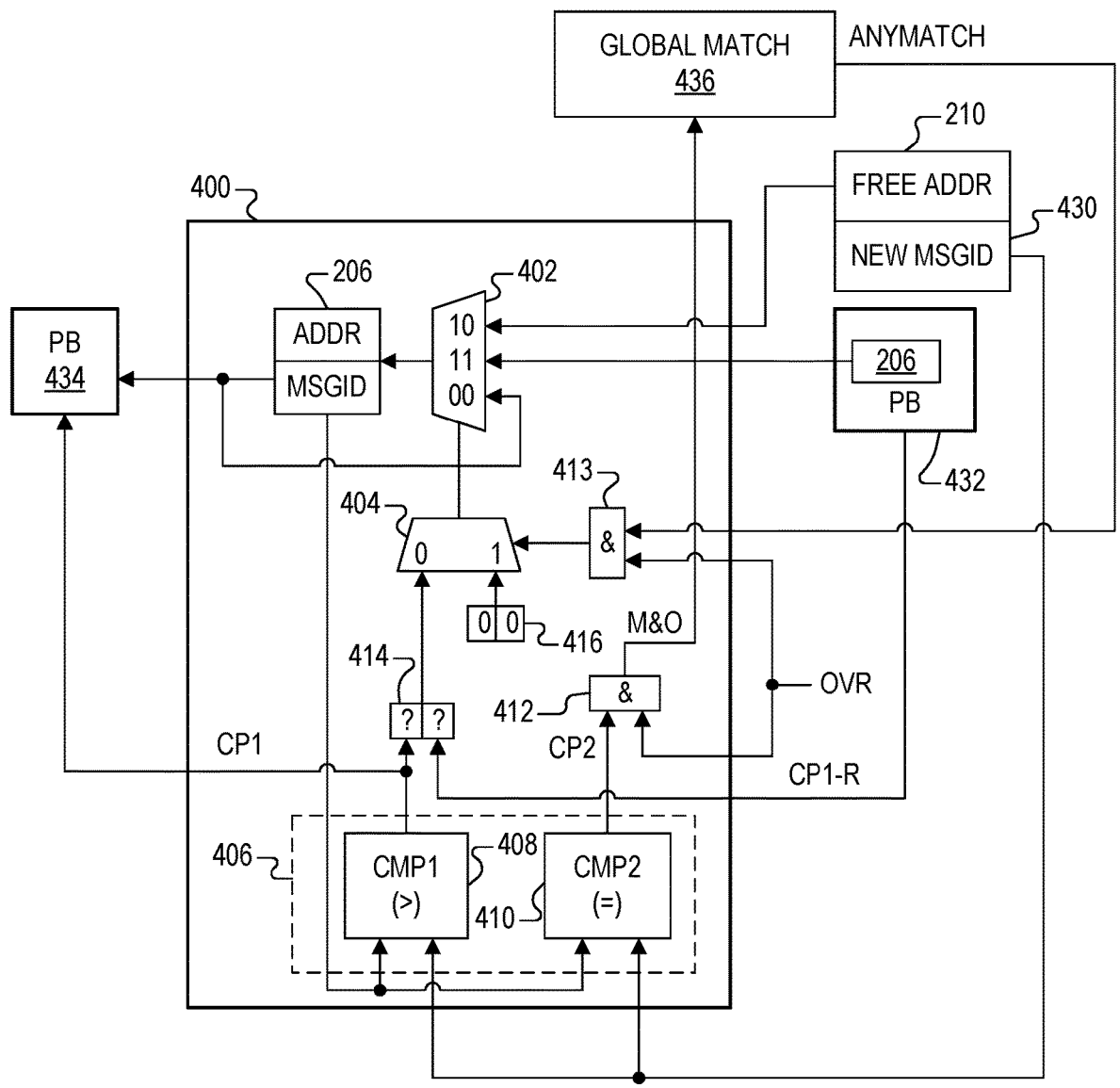
FIG. 4 is a more detailed schematic and block diagram of a priority block (PB) implemented according to one embodiment of the present disclosure interposed between an adjacent higher priority PB and an adjacent lower priority PB within the priority queue.

FIG. 4 is a more detailed schematic and block diagram of a PB 400 implemented according to one embodiment of the present disclosure interposed between an adjacent higher priority PB 432 and an adjacent lower priority PB 434 within the priority queue 300. The PB 400 may be used to implement each of the PBs PB-1, . . . , PB-m of the priority queue 300 including the PBs 432 and 434. In other words, each of the PBs may be implemented in substantially identical manner. In the illustrated embodiment, the PB 400 is implemented as a compare-shift block (CSB) for making substantially independent enqueue and dequeue decisions as further described herein. The PB 400 includes a corresponding one of the register blocks 206, select circuitry including a first multiplexer (MUX) 402 and a second MUX 404, comparator circuitry 406 including a first comparator 408 and a second comparator 410, a pair of 2-input Boolean logic AND gates 412 and 413, and buffer circuitry including a first 2-bit buffer 414 and a second 2-bit buffer 416. In the illustrated embodiment, the buffer 416 has a fixed value of "00". Also shown is the FREE ADDR 210 and a corresponding NEW MSGID 430, the higher priority adjacent PB 432 with its own register block 206, the lower priority adjacent PB 434, and global match circuitry 436.

In one embodiment, each buffer of the buffer circuitry may be implemented simply as a set of wires rather than actual buffer circuitry. In the illustrated embodiment, each of the "0" and "1" inputs of the MUX 404 includes 2 input bits. The buffer 414 may simply include a first wire coupling a first compare value CP1 to a first bit and a compare bit CP1-R to a second bit of the "0" input of the MUX 404. The buffer 416 may simply be implemented by connecting both bits of the "1" input of the MUX 404 to GND or any other logic "0" input. Alternatively, the buffer 414 could be implemented using actual buffers driving the signals into the "0" input bits of the MUX 404. Also, although the buffer circuitry may be implemented using memory devices, such as latches or flip-flops or the like, memory devices that may be dependent upon a clock could introduce undesired latency.

The MUX 402 has 3 multibit inputs labeled 10, 11, and 00, a multibit output coupled to an input of the local register block 206 of the PB 400, and a multibit control input receiving the output of the MUX 404 for selecting one of the inputs 10, 11, and 00. The 10 input of the MUX 402 receives the FREE ADDR 210 and the NEW MSGID 430, the 11 input of the MUX 402 receives the ADDR and MSGID stored in the register block 407 of the higher priority adjacent PB 432, and the 11 input of the MUX 402 is coupled to the output of the local register block 206 of the PB 400 via a feedback path 418. The output of the local register block 206 of the PB 400 is also provided to an input of the adjacent lower priority PB 434.

The comparator 408 has a first input receiving the local MSGID stored in the local register block 206 of the PB 400, a second input receiving the NEW MSGID 430 from the E2C block 116 received by the priority queue 300, and an output providing the first compare value CP1. The comparator 408 asserts CP1 as a binary value that is true or logic "1" when the local MSGID of the PB 400 is greater than the NEW MSGID 430. CP1 is false or logic "0" when the NEW MSGID 430 is less than or equal to the local MSGID of the PB 400. CP1 is provided as a most-significant bit (MSB) of the buffer 414, which has a least-significant bit (LSB) receiving a compare bit CP1-R from the PB 432. Since each of the PBs are implemented in substantially identical manner, the PB 432 includes a similar comparator providing an internal CP1 value that is externally provided as the value CP1-R to the PB 400. Also, CP1 is provided to the LSB bit of similar buffer circuitry within the PB 434. The buffer 414 thus provides CP1 and CP1-R as a 2-bit interblock compare result provided to a "0" input of the MUX 404. The fixed 2-bit value "00" of the buffer 416 is provided to a "1" input of the MUX 404, having a control input coupled to the output of the AND gate 413, and having an output coupled to the control input of the MUX 402.

The comparator 410 has a first input receiving the local MSGID stored in the local register block 206 of the PB 400, a second input receiving the NEW MSGID 430 received by the priority queue 300, and an output providing a second compare value CP2. The comparator 410 asserts CP2 as a binary value that is true or logic "1" when the local MSGID of the PB 400 is equal to the NEW MSGID 430. CP2 is false or logic "0" when the NEW MSGID 430 is not equal to the local MSGID of the PB 400. The compare values CP1, CP1-R and CP2 may collectively be referred to as a relative priority determination for determining whether to keep or shift and replace the locally stored address and identifier as further described herein. CP2 is provided to a first input of the AND gate 412, which receives OVR at its second input and which has an output providing a binary value M&O. The M&O value is true or logic "1" when OVR is true or logic "1" and when CP2 is also true or logic "1" but is otherwise false or logic "0". Thus, M&O is true when the local MSGID equals the NEW MSGID 430.

M&O is provided to an input of the global match circuitry 436, which has additional inputs each receiving a similar M&O value from each of the PBs of the priority queue 300, and which has an output providing a binary value ANYMATCH. ANYMATCH is true or logic "1" when the NEW MSGID 430 matches the locally stored MSGID of any of the PBs of the priority queue 300. In one embodiment, for example, the global match circuitry 436 may be implemented as Boolean OR logic which logically OR's each of the M&O values from the PB's of the priority queue 300 to logically determine ANYMATCH. ANYMATCH is provided to one input of the AND gate 413, which receives the OVR value at its other input and which has its output coupled to the control input of the MUX 404. In this manner, each PB of the priority queue 300 includes a similar AND gate (e.g., similar to the AND gate 413) for logically AND'ing ANYMATCH and OVR for controlling a corresponding MUX (e.g., MUX 404) with the PB.

Operation of the PB 400 is as follows. Assume first that the OVR value is false. When the OVR value is false, then the M&O value is false for each of the PBs of the priority queue 300 so that ANYMATCH is also false. In this case, the output of the AND gate 413 is logic "0" so that the MUX 404 selects its logic "0" input so that selection from among the input of the MUX 402 is determined by the value of the buffer 414. When the NEW MSGID 430 is greater than the local MSGID of the PB 400, then it is also greater than the MSGID of the PB 432 so that CP1 and CP1-R are both false or logic "0". In this case, the buffer 414 provides the value "00" in which the MUX 402 selects the feedback path 418 so that the register block 206 remains unmodified. This may be referred to as a keep operation in which each of the PBs of the priority queue 300 having a higher priority than the new message identifier remains unmodified.

When the OVR value is false and the NEW MSGID 430 is less than the local MSGID of the PB 400 but not greater than the MSGID of the PB 432, then CP1 is logic "1" while CP1-R is logic "0" so that the MUX 402 selects its "10" input. In this case, the FREE ADDR 210 and the NEW MSGID 430 are shifted into the local register block 206 of the PB 400 effectively replacing the local ADDR and MSGID of the PB 400. If the PB 400 was currently the lowest priority PB of the priority queue 300 (such that PB 434 were not present and the priority queue 300 is full), then the local ADDR and MSGID of the PB 400 would be shifted out as overflow and discarded. When, however, the PB 434 is present, then the local ADDR and MSGID of the PB 400 is shifted into a similar register block (e.g., another one of the register blocks 206) of the PB 434. This may be referred to as the shift and replace operation in which the new message identifier and corresponding new ADDR effectively replace the current PB while the current PB is shifted towards the lower priority end of the priority queue 300.

When the OVR value is false and the NEW MSGID 430 is less than the local MSGID of the PB 400 and also less than the MSGID of the PB 432, then CP1 and CP1-R are both logic "1" so that the MUX 402 selects its "11" input. In this case, the ADDR and MSGID of the PB 432 is shifted into the local register block 206 of the PB 400. In a similar manner as described above, if the PB 400 was currently the lowest priority PB of the priority queue 300 (such that PB 434 were not present), then the local ADDR and MSGID of the PB 400 would be shifted out as overflow and discarded. When, however, the PB 434 is present, then the local ADDR and MSGID of the PB 400 is shifted into the corresponding register block of the PB 434. This may also be referred to as the shift and replace operation except that the message identifier and corresponding ADDR of the adjacent higher priority PB effectively replace the current PB while the current PB is shifted towards the lower priority end of the priority queue 300.

When the OVR value is false and the NEW MSGID 430 is equal to the local MSGID of the PB 400 and thus also greater than or equal to the MSGID of the PB 432, then CP1 and CP1-R are both logic "0" so that the MUX 402 selects its "00" input. In this case, the buffer 414 provides the value "00" in which the MUX 402 selects the feedback path 418 so that the register block 206 remains unmodified. This is also a keep operation. Assume further that PB 434 is present and that the MSGID of the PB 434 is greater than the NEW MSGID so that the MUX 402 of the PB 434 selects its "10" input. In that case, the FREE ADDR 210 and the NEW MSGID 430 are shifted into the register block of the PB 434, while the contents of the register block of the PB 434 are shifted into the register block of the next lower priority PB and so on according to shift and replace operation. It is appreciated that when the OVR value is false, multiple messages with the same priority (e.g., same message identifiers) are shifted into the priority queue 300 adjacent each other forming a FIFO subset of matching entries within the priority queue 300.

Operation is similar when the OVR value is true and the NEW MSGID 430 does not match any of the current stored MSGIDs in the priority queue 300. In that case, ANY-MATCH is false so that PBs having higher priority MSGIDs remain unmodified according to keep operation, PBs having lower priority MSGIDs are shifted into the next lower priority PB (or discarded) and replaced by the ADDR and MSGID of the next higher priority PB or replaced by the FREE ADDR 210 and corresponding NEW MSGID 430. In this manner, the FREE ADDR 210 and corresponding NEW MSGID 430 are shifted into the priority queue 300 at the proper location to maintain priority integrity.

When the OVR value is true and the NEW MSGID 430 matches a currently stored MSGID in the priority queue 300, then since ANYMATCH and OVR are both true, the MUX 404 of each and every PB of the priority queue 300 selects its "1" input while the corresponding MUX 402 selects its "00" input so that the entire priority queue 300 appears to remain unmodified according to keep operation. In this case, however, the ADDR value in the register block 206 of the PB having the matching MSGID is used to store the message payload of the new message into a message buffer within the message storage 208. In other words, although the ADDR and MSGID of the matching PB remain unmodified, the previously stored message payload of the matching PB is replaced by the new message payload of the new message, so that the previous PB is replaced by a new PB with a new message payload.

In one embodiment, the CAN messages may be implemented according to standard CAN architecture in which each message identifier consists of 11 bits to allow for a total of 2,048 different message priority levels. The message priority level, however, has been extended in a later revision of CAN. The extended CAN frames format support a message identifier consisting of 29 bits. The extended messages contain an Identifier Extension (IDE) bit, which indicates a standard or extended message. A low (dominant) IDE bit indicates a standard message identifier and a high (recessive) IDE bit indicates a 29-bit ID. During bus arbitration, the standard 11-bit identifier frame would get a higher priority than an extended 29-bit identifier with an identical 11-bit base identifier. In a combined embodiment for supporting both standard and extended architectures, the IDE bit may be taken into account when sorting the priority queue 300. In the combined embodiment, for example, the message identifier may contain at least 30 bits including an 11-bit base identifier, followed by the IDE bit, followed by either the remaining 18 identifier bits of an extended message identifier or padded zeroes for a standard message identifier. This ensures that an 11-bit identifier has a higher priority than a 29-bit identifier having a matching 11-bit base identifier.

Figure 5:
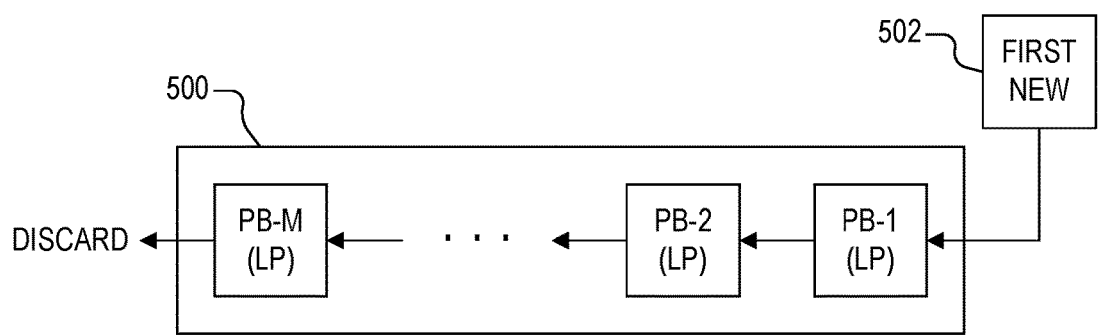
FIG. 5 is a simplified block diagram of a priority queue configured as a fixed-size linear chain illustrating initialization and an initial enqueuing operation according to one embodiment of the present disclosure.

FIG. 5 is a simplified block diagram of a priority queue 500 configured as a fixed-size linear chain illustrating initialization and an initial enqueuing operation according to one embodiment of the present disclosure. The priority queue 500 includes an integer number M PBs individually labeled PB-1 to CS-M in which each PB is configured in a similar manner as the PB 400 previously described. Additional supporting circuitry, such as including the global match circuitry 436, is included but not shown. The first PB-1 is at the highest priority end (shown on the right side of the priority queue 500) while the last PB-M is at the lowest priority end (shown on the left side of the priority queue 500) and the remaining PBs are linked or cascaded together in between PB-1 and PB-M in a similar manner previously described for the priority queue 300. In one embodiment before enqueuing operation begins, however, each of the PBs PB-1 to CS-M may be initialized by setting their local MSGIDs to a lowest priority (LP) value as shown in parenthesis in each of the PBs. Technically, this means that each PB of the priority queue 500 initially has the same lowest priority (e.g., each has the same priority value LP). Enqueuing operation begins with a first new message 502 with a new message identifier and corresponding new address (pointing to corresponding message payload inserted into the message storage 208) being inserted into the highest priority PB-1. In other words, since the new message identifier of the new message 502 has a higher priority than LP, it is inserted on the highest priority end as the highest priority PB. As illustrated by arrows from one PB to the next, the content of each PB is shifted from highest priority to lowest priority (or from right to left). The content in the last PB-M is replaced and thus discarded.

Enqueuing operation continues in a similar manner previously described for the PB 400 and the priority queue 300. Since "empty" or "invalid" PBs are initialized with a lowest value MSGID (or LP), new messages automatically have higher priority and are inserted at the higher priority end with the message content of lower priority PBs shifted towards the lower priority end or discarded. Thus, if the second new message has a higher priority than the first new message, it is inserted into the highest priority PB-1 while the first new message is shifted into the next highest priority PB-2. On the other hand, if the second new message has a lower priority than the first new message, then it is inserted into PB-2 while PB-1 remains unmodified. Operation continues in this manner for additional enqueuing operations. If enqueuing operation outpaces dequeuing operation, then the priority queue 500 may become full so that messages may eventually be discarded as overflow as newer messages are received and enqueued.

Figure 6:
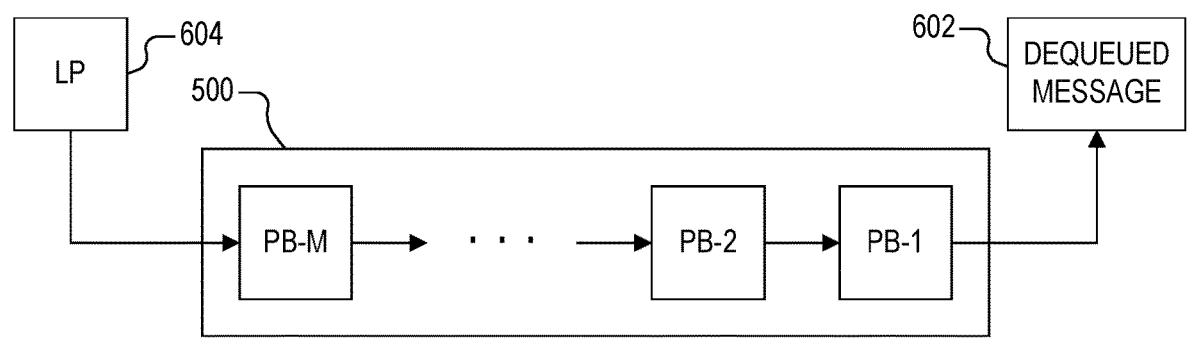
FIG. 6 is a simplified block diagram of the priority queue of FIG. 5 illustrating dequeuing operation according to one embodiment of the present disclosure.

FIG. 6 is a simplified block diagram of the priority queue 500 illustrating dequeuing operation according to one embodiment of the present disclosure. When the corresponding CAN controller 110 is ready to transmit the next message, the MSGID and corresponding message payload of the highest priority PB-1 is dequeued into a dequeued message 602 for delivery to the corresponding CAN controller 110. After dequeuing for the priority queue 500, the message content in each of the PBs PB-M to PB-2 is shifted into the next higher priority PB as illustrated by arrows from one PB to the next pointing to the right. In order to ensure priority integrity, lowest priority (LP) content 604 is shifted into the lowest priority PB-M. It is noted, however, that the PB 400 previously described does not include or otherwise does not illustrate entry shifting from lower priority to higher priority. Thus, additional multiplexer circuitry (not shown) would be included to implement such dequeue shift operation adding complexity and increasing overall power consumption.

Figure 7:
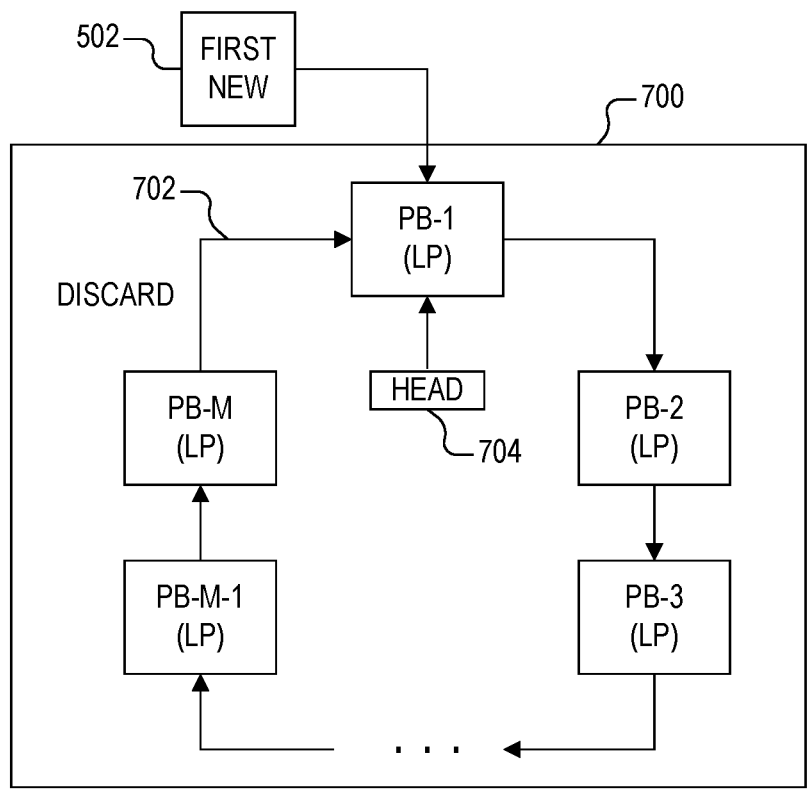
FIG. 7 is a simplified block diagram of a priority queue configured as a fixed-size circular buffer illustrating initialization and an initial enqueuing operation according to one embodiment of the present disclosure.

FIG. 7 is a simplified block diagram of a priority queue 700 configured as a fixed-size circular buffer illustrating initialization and an initial enqueuing operation according to one embodiment of the present disclosure. The priority queue 700 is similar to the priority queue 500 and includes an integer number M PBs individually labeled PB-1 to PB-M in which each PB is configured in a similar manner as the PB 400 previously described. Additional supporting circuitry, such as including the global match circuitry 436, is included but not shown. A first PB-1 is initially the highest priority PB and a last PB-M is initially the lowest priority PB and the remaining PBs are linked or cascaded together in between PB-1 and PB-M in a similar manner previously described. The priority queue 700 additionally includes a feedback link 702 from PB-M to PB-1 in circular buffer fashion. Also, a head pointer 704 or the like identifies the head of the priority queue 700 having the highest priority. Initially, the head pointer 704 points to PB-1 as the "highest" priority of the priority queue 700. As with the priority queue 500, in one embodiment before enqueuing operation begins, each of the PBs PB-1 to PB-M are initialized by setting their local MSGIDs to a lowest priority (LP) value as previously described. Again, technically this means that each PB of the priority queue 700 initially has the same lowest priority (e.g., each has the same priority value LP).

The priority queue 700 is similar to the priority queue 500 except that the highest priority PB is identified by the head pointer 704 rather than defaulting to PB-1. Enqueuing operation for the priority queue 700 is substantially similar as the priority queue 500 with the understanding that the head pointer 704 identifies the highest priority PB. Enqueuing operation begins with the first new message 502 being inserted into the highest priority PB-1. As illustrated by arrows from one PB to the next, the content of each PB is shifted from highest priority (pointed to by the head pointer 704, such as initially PB-1 as shown) to lowest priority (which is initially PB-M as shown). As before, the content in the last PB-M is replaced and thus discarded. Although feedback link 702 is included back to the PB-1, PB-1 initially selects the first new entry rather than the entry stored in PB-M.

Enqueuing operation continues in a similar manner previously described for the PB 400 and the priority queue 500. Since "empty" or "invalid" PBs are initialized with a lowest value MSGID, new messages automatically have higher priority and are inserted at the higher priority end with the message content of lower priority PBs shifted towards the lower priority end or discarded. Thus, if the second new message has a higher priority than the first new message, it is inserted into the highest priority PB pointed to by the head pointer 704 while the first new message is shifted into the next highest priority PB. If the second new message has a lower priority than the first new message, then it is inserted into PB-2 while PB-1 remains unmodified. Operation continues in this manner for additional enqueuing operations, in which the head pointer 704 remains unmodified for each enqueuing operation (and only changes for dequeuing operation, described below). If enqueuing operation outpaces dequeuing operation, then the priority queue 700 may become full so that lower priority messages may eventually be discarded as higher priority newer messages are received and enqueued.

Figure 8:
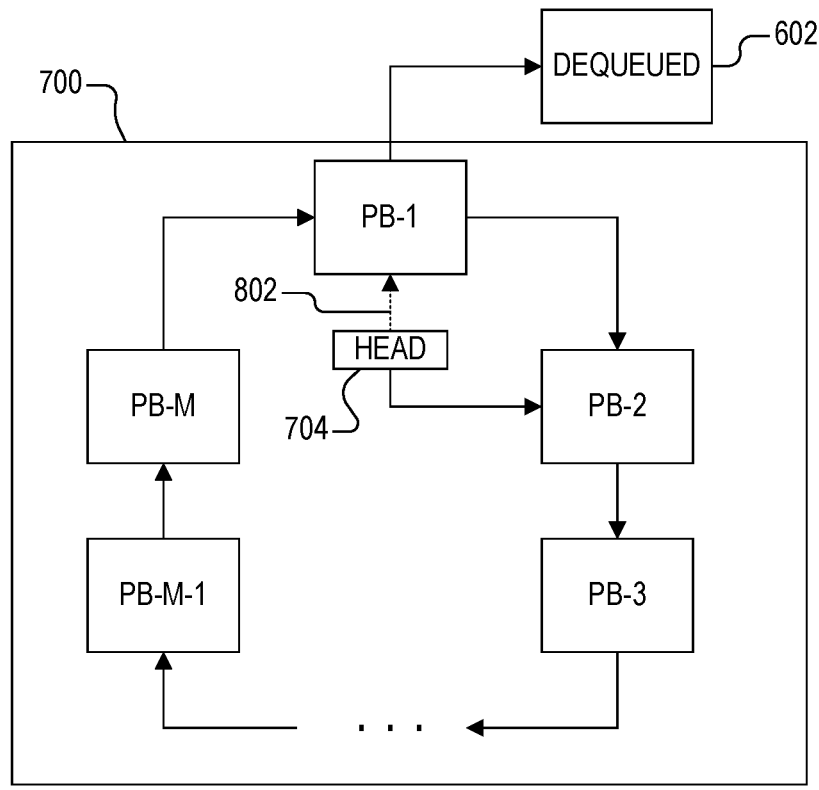
FIG. 8 is a simplified block diagram of the priority queue of FIG. 7 illustrating dequeuing operation according to one embodiment of the present disclosure.

FIG. 8 is a simplified block diagram of the priority queue 700 illustrating dequeuing operation according to one embodiment of the present disclosure. When the corresponding CAN controller 110 is ready to transmit the next message, the MSGID and corresponding message payload of the highest priority PB pointed to by the head pointer 704 (e.g., initially PB-1 as indicated by dotted line 802) is dequeued into the dequeued message 602 for delivery to the corresponding CAN controller 110. After dequeuing for the priority queue 700, the head pointer 704 is updated to point to the next highest priority PB, shown as PB-2. Although not shown, when the message in PB-2 is dequeued, the head pointer 704 is updated in similar manner to PB-3, and so on. The head pointer 704 remains unmodified for each enqueuing operation and is updated for each dequeuing operation. The use of the head pointer 704 avoids shifting of content from lower priority to higher priority PBs during dequeuing since it is updated to point to the highest priority PB upon each dequeue operation. In addition, any new message having higher priority than those messages current stored in the priority queue 700 is inserted into the highest priority PB pointed to by the head pointer 704 and the entries are shifted from higher to lower priority as previously described.

Figure 9:
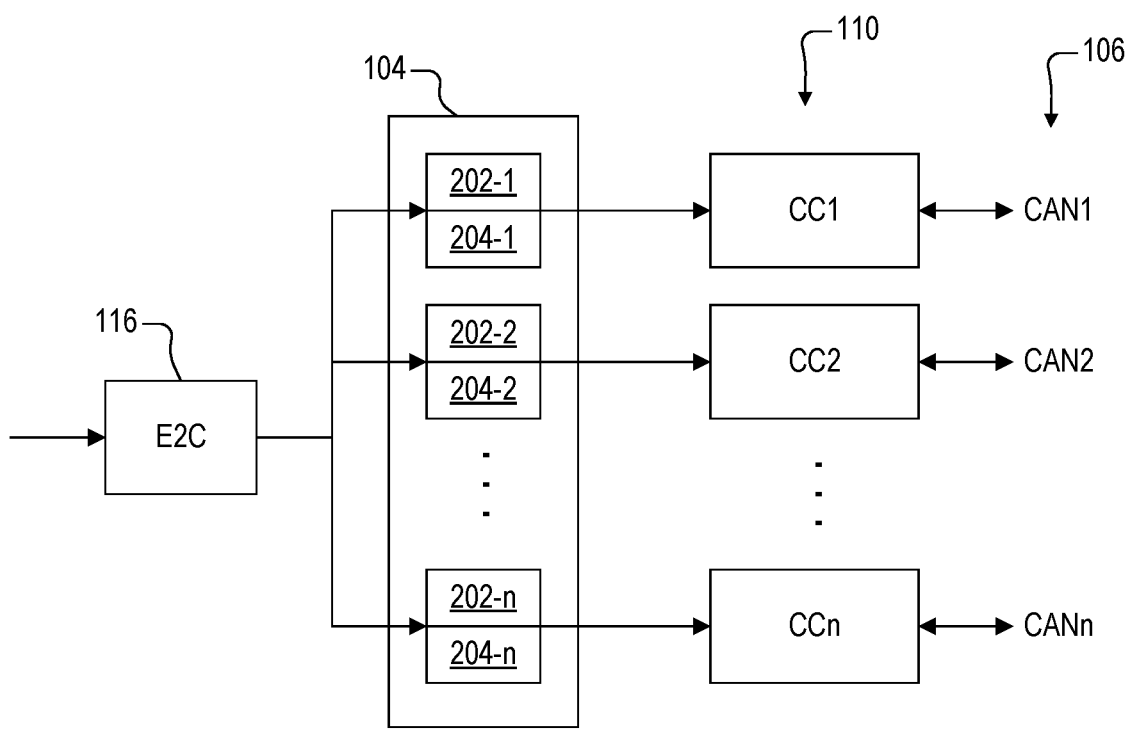
FIG. 9 is a simplified block diagram of the priority queue sorting system interposed between the E2C converter and CAN controllers of FIG. 1 for transmitting CAN messages to the CAN subnetworks of the CAN network of FIG. 1 according to one embodiment of the present disclosure.

FIG. 9 is a simplified block diagram of the priority queue sorting system 104 interposed between the E2C converter 116 and the CAN controllers 110, individually shown as CC1, CC2, . . . CCn, for transmitting CAN messages to the CAN buses CAN1-CANn, respectively, of the CAN network 106 according to one embodiment of the present disclosure. The CAN network 106 is a multiple network system (or multiple bus system), so that the priority queue sorting system 104 maintains multiple queues in which each queue stores and sorts the corresponding messages for the bus.

The priority queue sorting system 104 includes a set of n priority queues 202-1, 202-2, . . . 202-*n*, each including a corresponding one of a set of n message storages 204-1, 204-2, . . . , 204-*n*, respectively. Although not specifically shown, each of the message storages 204-1 to 204-*n* is subdivided into message buffers (e.g., similar to the message buffers of each message storage 208). In one embodiment, the E2C converter 116 distributes CAN messages received from the Ethernet network 108 to the identified one of the priority queues 202-1 to 202-*n* based on a CAN address or identifier or the like. In an alternative embodiment, the priority queue sorting system 104 includes additional circuitry to distribute received CAN messages among the priority queues 202-1 to 202-*n*.

Each of the priority queues 202-1 to 202-*n* operates in a similar and independent manner as any one of the priority queues 300 or 500 or 700 previously described, each including a cascaded set of PBs configured according to the PB 400 previously described. When ready to transmit a next CAN message to a corresponding one of the CAN buses CAN1-CANn, the corresponding one of the CAN controllers CC1-CCn, respectively, dequeues the next message from the corresponding one of the priority queues 202-1 to 202-*n*, respectively, along with a corresponding CAN message payload retrieved from the corresponding one of the message storages 204-1 to 204-*n*, respectively.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims. For example, variations of positive circuitry or negative circuitry may be used in various embodiments in which the present invention is not limited to specific circuitry polarities, device types or voltage levels or the like. For example, circuitry states, such as circuitry low and circuitry high may be reversed depending upon whether the pin or signal is implemented in positive or negative circuitry or the like. In some cases, the circuitry state may be programmable in which the circuitry state may be reversed for a given circuitry function.

The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A priority queue sorting system, comprising:
   a priority queue comprising plurality of priority blocks that are cascaded in order from a lowest priority block to a highest priority block, wherein each priority block comprises:
      a register block for locally storing an address and an identifier;
      compare circuitry that is configured to compare a new identifier with the locally stored identifier for providing a relative priority determination; and
      select circuitry that is configured to determine whether to keep or shift and replace the locally stored address and identifier within the priority queue based on the relative priority determination; and
   a message storage for storing a plurality of message payloads, each pointed to by a corresponding address of a corresponding one of the plurality of priority blocks.

2. The priority queue sorting system of claim 1, wherein the select circuitry is configured to keep the locally stored address and identifier when the locally stored identifier has higher priority than the new identifier, or when the locally stored identifier and the new identifier have the same priority and an overwrite value is false, or when the locally stored identifier has lower priority than the new identifier and the overwrite value is true and the new identifier has the same priority as an identifier stored by at least one of the plurality of priority blocks.

3. The priority queue sorting system of claim 2, wherein the priority queue is configured to replace a payload stored in the message storage pointed to by the corresponding locally stored address with a new payload when the locally stored identifier and the new identifier have the same priority and the overwrite value is true.

4. The priority queue sorting system of claim 1, wherein the select circuitry is configured to shift the locally stored address and identifier into an adjacent priority block of the priority queue having a lower priority when the new identifier has higher priority than the locally stored identifier and either an overwrite value is false or the new identifier does not match an identifier stored by any of the plurality of priority blocks.

5. The priority queue sorting system of claim 4, wherein the select circuitry is configured to replace the locally stored address and identifier with a new address and the new identifier, respectively, when the new identifier does not have a higher priority than an identifier stored by an adjacent priority block of the priority queue having a higher priority.

6. The priority queue sorting system of claim 4, wherein the select circuitry is configured to replace the locally stored address and identifier with an address and identifier, respectively, stored by an adjacent priority block of the priority queue having a higher priority when the new identifier has a higher priority than the identifier of the adjacent priority block of the priority queue having a higher priority.

7. The priority queue sorting system of claim 1, wherein the select circuitry comprises a first multiplexer having an output coupled to an input of the register block, having a first input receiving the new identifier and a corresponding new address, having a second input receiving an identifier and a corresponding address from an adjacent priority block of the priority queue having a higher priority, and having a third input coupled to an output of the register block.

8. The priority queue sorting system of claim 7, wherein the select circuitry comprises a second multiplexer having an output coupled to a control input of the first multiplexer, having a first input receiving an interblock compare result, having a second input for selecting the third input of the first multiplexer, and having a control input for selecting the second input of the second multiplexer only when an overwrite value is true and when the new identifier matches at least one identifier of the plurality of priority blocks.

9. The priority queue sorting system of claim 8, wherein the compare circuitry comprises a first comparator having an output that is configured to indicate whether the locally stored identifier has a lower priority than the new identifier, and wherein the interblock compare result comprises a combination of outputs of the first comparator and a corresponding first comparator of an adjacent priority block of the priority queue having a higher priority, wherein the interblock compare result can be used to select the first input of the first multiplexer when the new identifier has a higher priority than the locally stored identifier but a lower priority than the adjacent priority block, to select the second input of the first multiplexer when the new identifier has a higher priority than the locally stored identifier and a higher priority than the adjacent priority block, or to select the third input of the first multiplexer when the new identifier does not have a higher priority than either the locally stored identifier or the adjacent higher priority block.

10. The priority queue sorting system of claim 9, wherein the compare circuitry comprises:
    a second comparator having an output that is configured to indicate whether the locally stored identifier and the new identifier have equal priority; and
    first AND circuitry that is configured to assert its output true when the output of the second comparator is true and an overwrite value is true.

11. The priority queue sorting system of claim 10, further comprising:
    the compare circuitry of each of the plurality of priority blocks comprising second AND circuitry having a first input for receiving the overwrite value, having a second input, and having an output coupled to the control input of the second multiplexer; and
    OR logic having a plurality of inputs, each coupled to the output of the first AND circuitry of each of the plurality of priority blocks, and having an output coupled to the second input of the second AND circuitry of each of the plurality of priority blocks.

12. The priority queue sorting system of claim 1, wherein the priority queue is organized as a linear chain.

13. The priority queue sorting system of claim 12, wherein the priority queue is configured to shift the address and identifier stored in the register block of each of the plurality of priority blocks into the register block of an adjacent higher priority block after the highest priority block is dequeued.

14. The priority queue sorting system of claim 1, wherein the priority queue is organized as a circular buffer comprising a head pointer that points to the highest priority block.

15. The priority queue sorting system of claim 14, wherein the priority queue is configured to update the head pointer to point to the next lower priority block in the priority queue when the highest priority block is dequeued.

16. The priority queue sorting system of claim 1, wherein the identifier comprises a message identifier that determines relative priority.

17. The priority queue sorting system of claim 1, wherein the identifier comprises a base identifier followed by an identifier extension bit followed by either remaining identifier bits of an extended message identifier or padded zeroes for a standard message identifier.

18. The priority queue sorting system of claim 1, wherein the message storage comprises a plurality of message buffers, each for storing a corresponding one of the plurality of message payloads.

19. The priority queue sorting system of claim 18, wherein the priority queue is configured to store a new address corresponding with the new identifier into a free one of the plurality of message buffers.

20. The priority queue sorting system of claim 1, further comprising a shared memory for storing a plurality of message storages, each for storing a plurality of message payloads for a corresponding one of a plurality of priority queues.

\* \* \* \* \*